United States Patent [19]

McGhee et al.

[11] 3,717,030
[45] Feb. 20, 1973

[54] TIRE PRESSURE INDICATING APPARATUS

[76] Inventors: Clarence L. McGhee, 1702 Hilltop Lane, Arlington, Tex. 76010; Dennis C. Enders, 2309 Carmel Drive, Colorado Springs, Colo. 80910

[22] Filed: Jan. 4, 1971

[21] Appl. No.: 103,500

[52] U.S. Cl..................73/146.3, 137/227, 137/607, 137/609, 137/613, 152/429
[51] Int. Cl..............................................B60c 23/04
[58] Field of Search....73/146.3, 146.4, 146.5, 146.8, 73/419; 137/227, 228; 340/58, 224; 152/429

[56] References Cited

UNITED STATES PATENTS

| | | | |
|---|---|---|---|
| 2,860,321 | 11/1958 | Strickland | 340/58 |
| 3,588,815 | 6/1971 | Koonce | 340/58 |
| 2,168,145 | 8/1939 | Willis | 73/146.3 |
| 2,800,795 | 7/1957 | Trinca | 73/146.3 |
| 1,513,740 | 11/1924 | Brown | 137/227 X |

Primary Examiner—Donald O. Woodiel
Attorney—Cecil L. Wood and Peter J. Murphy

[57] ABSTRACT

For monitoring tire pressures on a vehicle such as a passenger automobile, truck or bus, individual hub units are mounted on each wheel unit, each hub unit including a radio transmitter, and a radio receiver is positioned leading to the vehicle operator. Each hub unit includes bellows means responsive to tire pressure to operate a visual pressure gauge on the hub unit which may be observed by the operator when the vehicle is stopped, and to energize the transmitter when the pressure decreases to a preselected value. For dual wheel units used on heavy duty vehicles, a common bellows means may respond to the lower pressure of the two tires to indicate the lower pressure on the gauge and transmit the fault signal. The dual wheel unit may include two bellows means for actuating separate visual gauges for the two tires, with the two bellows mechanisms energizing a common transmitter, or alternatively energizing respective separate transmitters. The hub unit may include valve means for equalizing tire pressures.

8 Claims, 17 Drawing Figures

INVENTORS
Clarence L. McGhee
Dennis C. Enders

BY

ATTORNEYS

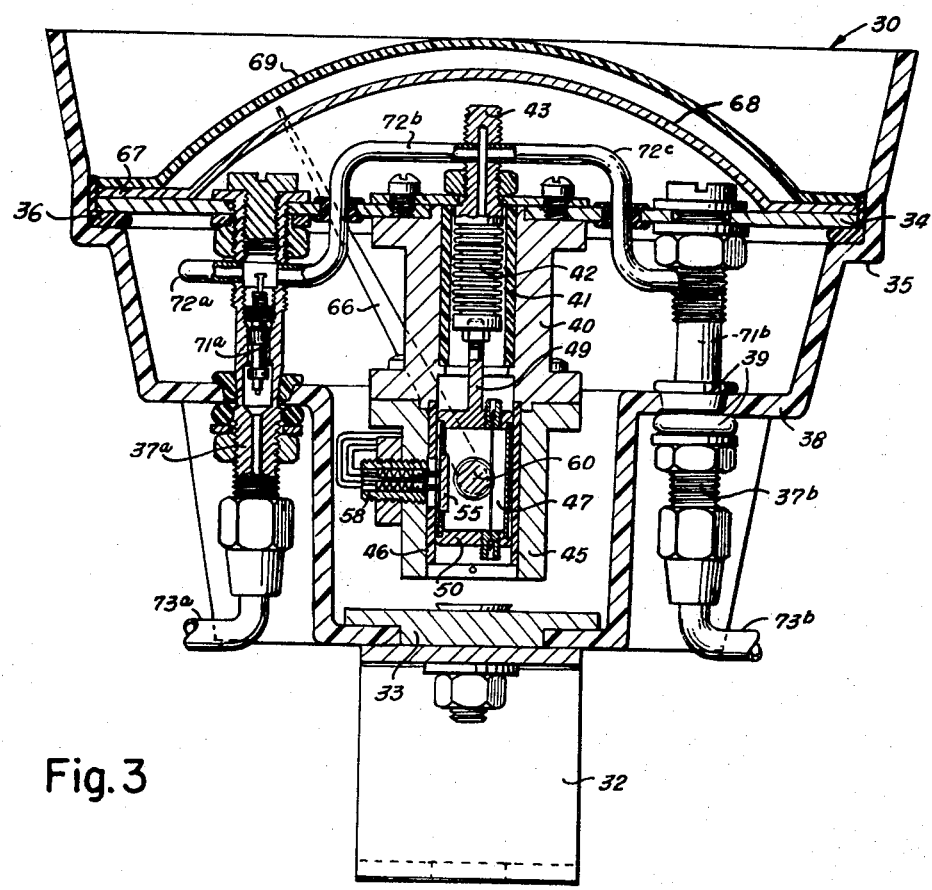
Fig. 3
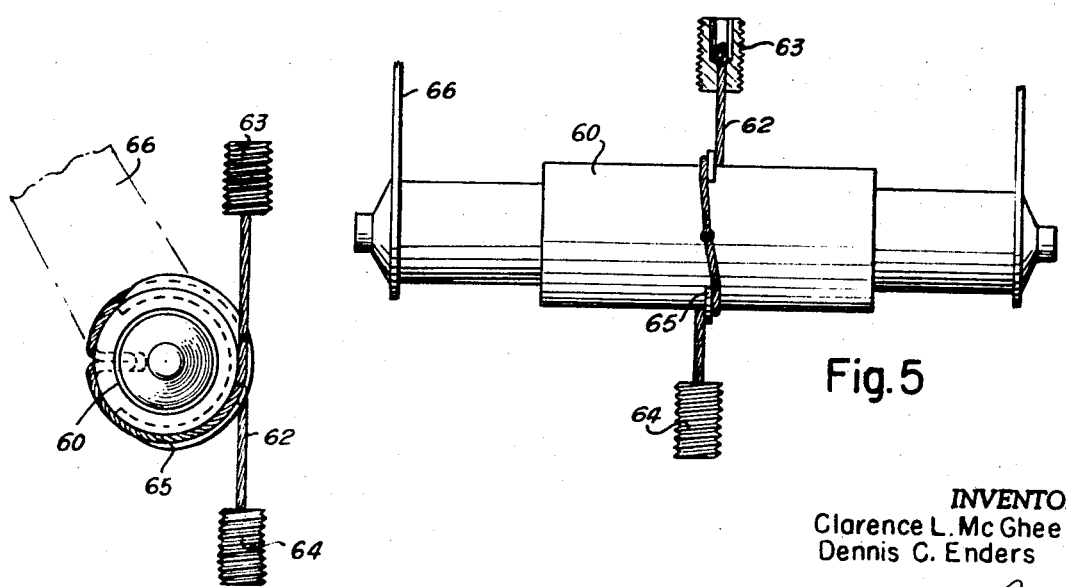
Fig. 6
Fig. 5
INVENTORS
Clarence L. McGhee
Dennis C. Enders
Cecil L. Wood
Peter J. Murphy
ATTORNEYS

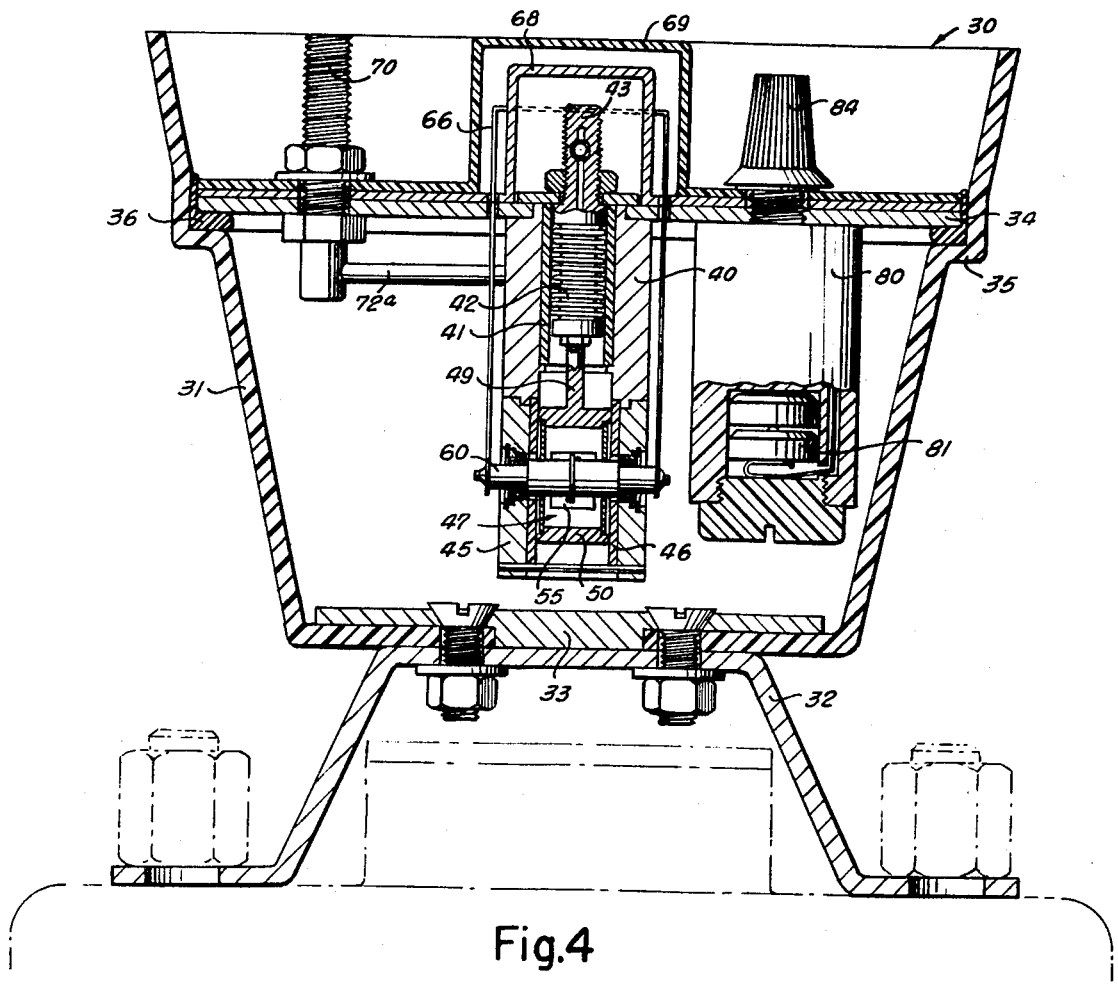
Fig.4
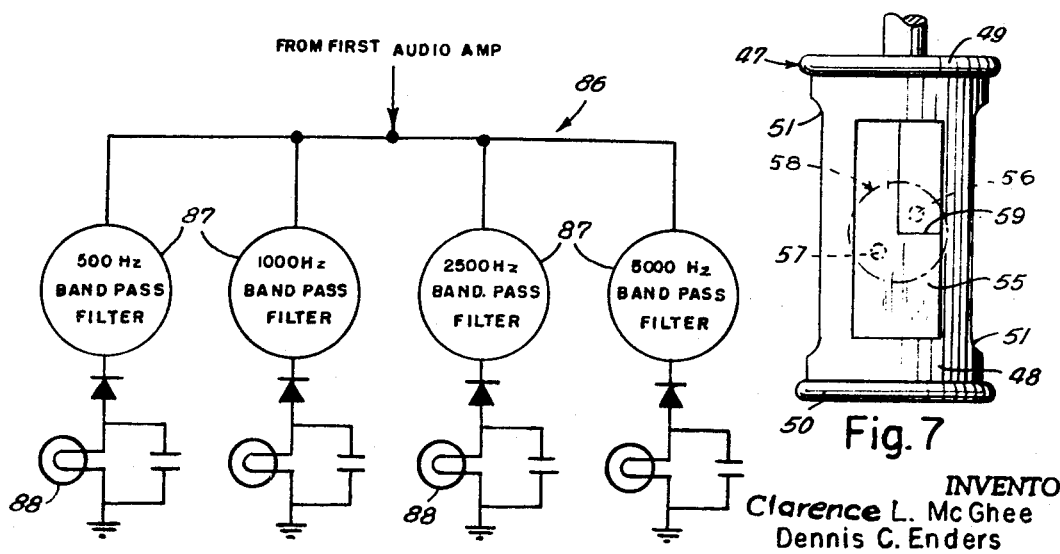
Fig.8
Fig.7

INVENTORS
Clarence L. McGhee
Dennis C. Enders

ATTORNEYS

TIRE PRESSURE INDICATING APPARATUS

BACKGROUND AND SUMMARY OF THE INVENTION

This invention is concerned with the monitoring of tire pressures on a vehicle, with the transmission of a fault or warning signal to the vehicle operator when tire pressure decreases to a predetermined critical value, and with providing visual indication of tire pressures at the wheel units.

With any type of vehicle which is operated at highway speeds, it is desirable to be aware of loss of pressure in one or more of the vehicle tires, particularly from the standpoint of safety. It is known that vehicles become increasingly hard to control as one or more tires become soft and, particularly in emergency situations, such reduced control may result in complete loss of control with resultant injury to the occupants of such vehicles and to other vehicles which may be involved in collision. This condition is particularly serious in heavy duty vehicles and heavy loaded vehicles such as trucks, buses, or tractor-trailer units.

In addition to personal injury losses, losses may be incurred in the lading in the case of freight-hauling vehicles. Apart from the major losses mentioned above, it is important from the economic standpoint in the operation of a trucking fleet for example to maintain proper tire pressure to prevent excessive tread wear. In the case of dual tire wheel units, particularly, excessive tread wear will occur on the softer of the two tires and such excessive tread wear may be aggravated by the road surface conditions or the particular load conditions of the vehicle. It is important in this respect to keep the pressures relatively equal in dual wheel units; and for this purpose vehicle operators make frequent stops to check the pressure of the tires. Unequal tire pressure may occur in a dual wheel unit not only through pressure loss through a slow leak in one tire, but also due to unequal pressure build-up due to heat as a result of the road surface or load conditions.

A principal object of this invention is to provide an improved and reliable system and apparatus for detecting pressure loss and for providing a warning or fault signal to the vehicle operator when a pressure loss occurs.

Another object of this invention is to provide such apparatus including local signal transmitting units mounted on each wheel of the vehicle, which transmit to a common receiver.

A further object of this invention is to provide such apparatus wherein the local transmitting units include visual gauge means for indicating the tire pressure.

A still further object of this invention is to provide an apparatus and system wherein the local transmitting units function with a dual wheel unit to transmit a fault signal when either one or both of the tires loses critical pressure.

Still another object of this invention is to provide such apparatus for dual wheel units wherein the visual gauge indicates a single pressure which is the lower pressure of the two tires.

A still further object of this invention is to provide apparatus wherein the local hub units provide means for equalizing the pressures in the two tires of a dual wheel unit.

These objects are accomplished by apparatus which includes broadly a hub unit mounted on a vehicle wheel unit for rotation therewith, the hub unit including a pressure responsive mechanism communicated with the tire chamber to actuate a visual indicator gauge on the unit and to actuate, at a preselected pressure, a keying switch for energizing transmitter. A remote receiver produces a warning signal for the vehicle operator. More particularly, for a dual wheel unit the tires are inflated through a common fill valve, and the pressure gauge and transmitter switch respond to the lower pressure of the two tires of the unit. Additionally, for a dual wheel unit means are provided for automatically equalizing the tire pressures above a preselected value and for manually equalizing the tire pressures at any pressure.

The novel features and the advantages of the invention, as well as additional objects thereof, will be understood more fully from the following description when read in connection with the accompanying drawings.

DRAWINGS

FIGS. 3 and 4 are sectional views taken through the axis of rotation of the unit of FIG. 2 in the planes indicated in FIG. 2;

FIG. 5 is a fragmentary view, in elevation, of the drive shaft for the pressure gauge indicator arm as seen in FIGS. 3 and 4;

FIG. 6 is an end view of the drive shaft of FIG. 5;

FIG. 7 is a fragmentary view, in elevation, of the translation sleeve including the transmitter switch actuator plate, as seen in FIGS. 3 and 4;

FIG. 8 is a schematic view of a portion of the radio receiver circuitry for use in apparatus according to the invention;

DESCRIPTION OF THE PREFERRED EMBODIMENTS

To be described are several forms of apparatus or systems for detecting the pressures of one or both tires of a dual wheel unit. The apparatus is particularly adapted for heavy duty vehicles such as trucks, tractor-trailer units and buses which conventionally use two or more dual wheel units. The apparatus includes self-contained hub units which are secured on each dual wheel unit for rotation therewith, and preferably coaxial with the axis of rotation. The hub units include means for detecting the actual pressures in either (1) both of the tires of a dual wheel unit or (2) one tire of the dual wheel unit having the lower pressure, and include visual means for indicating the detected pressures. The hub units also include radio transmitter means actuated when the detected pressure decreases to a predetermined critical value to transmit a signal to a remote receiver. The receiver, preferably located to be conveniently operated and observed by the operator of the vehicle detects the transmitted signal and operates visual and/or audible warning devices which may include means for identifying the particular hub unit which is transmitting.

SINGLE READOUT INDICATING APPARATUS

Figure 1:
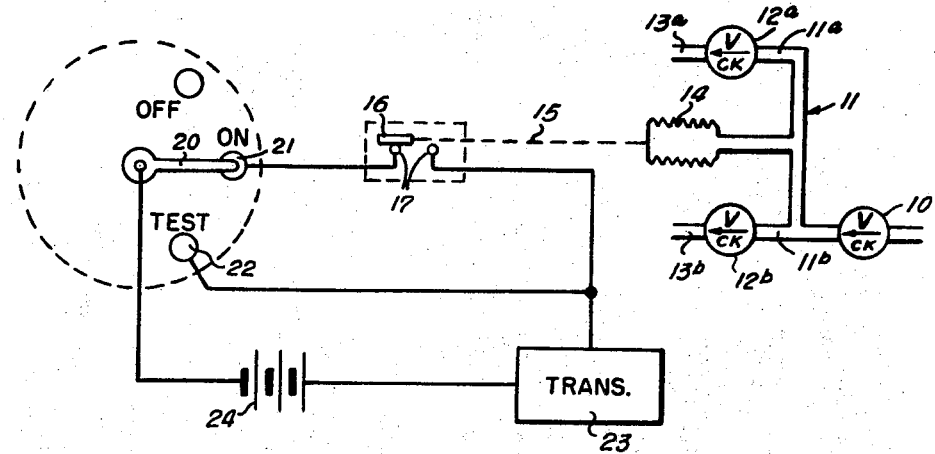
FIG. 1 is a combination diagrammatic and schematic view of pneumatic and electrical systems for one form of apparatus according to the invention.
Figure 2:
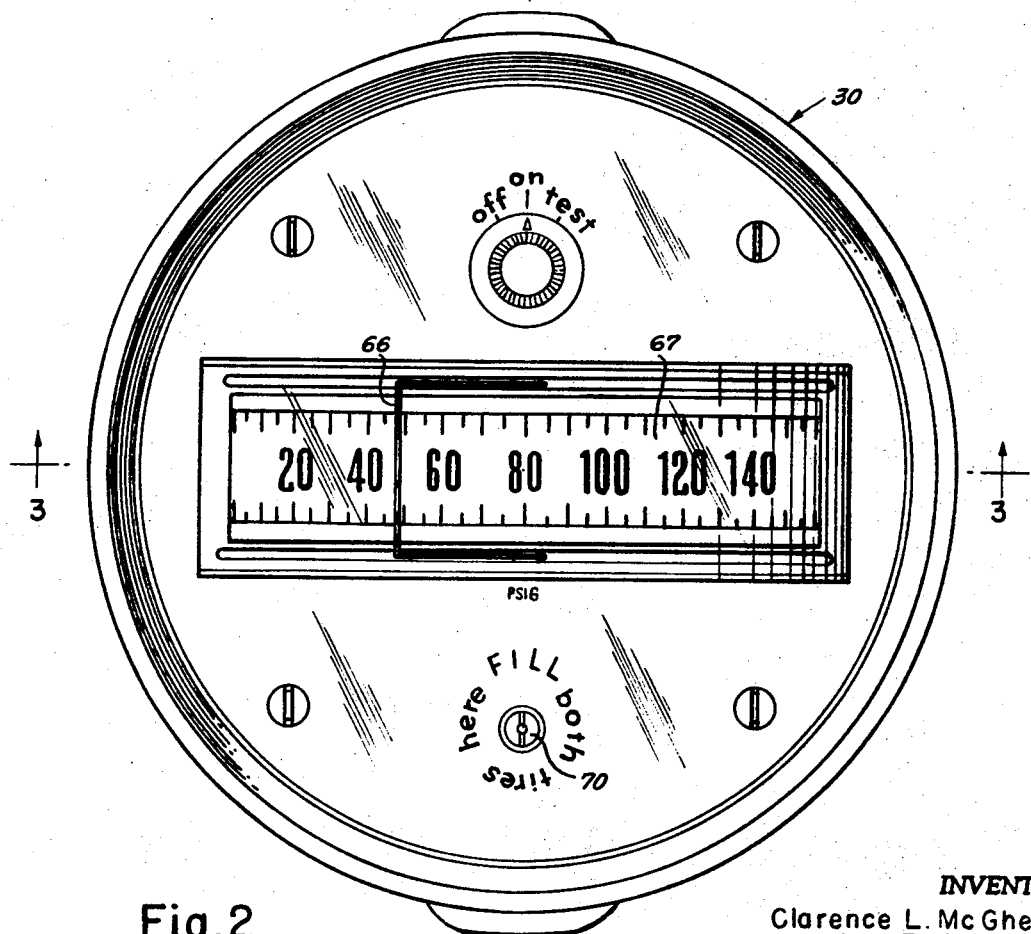
FIG. 2 is a view of the outer face of a hub unit for attachment to the hub of a wheel unit, as viewed along the axis of the wheel unit.

FIG. 1 is a schematic diagram of pneumatic and electric circuitry for a Single Readout indicating apparatus according to the invention which is so named since it includes a single visual gauge on the hub unit which indicates the lower of two pressures corresponding to the pressures in the two tires of the wheel unit and which also includes a single transmitter for transmitting a signal identifying the hub unit but not the particular tire of the unit which has lost pressure. One form of hub unit for a single gauge system is illustrated in FIGS. 2, 3 and 4; and all of the circuitry illustrated in FIG. 1 is contained within such hub unit.

Referring to the system as illustrated in FIG. 1, the tires of the dual wheel unit are inflated through a fill valve 10 which preferably has the configuration of a standard automotive tire fill valve and core and which is disposed on a hub unit for convenient servicing. Conduit means 11 define a manifold for communicating the fill valve 10 with two tire check valves 12a and 12b which are associated with the respective tires of the dual wheel unit. The check valves 12a and 12b may also be standard automotive tire fill valves and cores having a low spring constant so that these valves will open in response to a pressure differential of about 1 psi. These check valves permit the flow of air from the manifold 11 into the tires but prevent reverse flow from the tires into the manifold 11.

The conduit portions of the manifold 11 which communicate directly with the check valves 12a and 12b are conduits 11a and 11b respectively. Conduits 13a and 13b are external tire conduits which may be in the form of hoses of rubber or similar material for connecting the check valves in the hub unit with the conventional fill tubes associated with each of the tires.

A bellows 14, chosen to produce rectilinear movement in response to air pressure changes, is connected to the manifold 11 to reflect the pressure within the manifold. The bellows 14 is connected through suitable linkage 15 to a rectilinearly movable switch plate 16 coacting with fixed contacts 17 to selectively close or open an electric circuit.

Referring to the electric schematic diagram there is indicated a selector switch identified by a contactor arm 20, and associated "on" contact 21, and an associated "test" contact 22. In the condition of the circuit illustrated in FIG. 1, a radio transmitter 23 is connected to a battery 24 through a series circuit including the switch 16, 17 and the selector switch arm and contact 21. In this normal operating condition of the selector switch, the transmitter is energized when the switch plate 16 is shifted to bridge the fixed contacts 17. To test the transmitter circuit, the switch arm 20 may be shifted to engage the test contact 22 to connect the transmitter and battery to a circuit by-passing the keying switch 16, 17.

Referring now particularly to FIGS. 2, 3 and 4, a hub unit 30 enclosing the above-described components, as well as other components, is generally frusto-conical in axial cross section, as seen in FIGS. 3 and 4 the larger diameter defining a circular face facing outward of the wheel unit to which the housing is attached. The housing 31 may be fabricated of a plastic material for example; and is rigidly mounted to the hub of a vehicle wheel unit by means of an appropriate hub adapter bracket 32 and centering plate 33. For uniformity and standardization, the housing would have a standard configuration as would the centering plate, these being designed to accommodate a variety of brackets for mounting the hub unit to wheel units of various manufacture and configuration. These hub units are designed so that the central axis of the housing 31 may be disposed coaxially with the axis of rotation of the wheel unit.

A circular carrier plate 34 is a principal structural member of the hub unit. This plate is preferably fabricated of metal and is seated on a circular shoulder 35, provided in the housing in a plane parallel to and adjacent to the outer face of the housing. A shock absorbing resilient gasket 36 isolates the carrier plate 34 from the housing. The carrier plate is secured against the seat 35 by means of mounting studs 37a and 37b which are threadedly secured to the carrier plate and extend transversely therefrom through apertures provided in shoulders 38 provided in the housing wall and defining wall surfaces parallel to the plane of the carrier plate. The mounting studs 37a and 37b are seated in and are suitably secured to the housing shoulders 38 through shock mounting gaskets 39.

As best seen in FIG. 3, a bellows carrier 40 is mounted on the carrier plate 34 extending inwardly toward the base of the housing and defines a cylindrical recess lined with a bushing 41. An extension type bellows 42 for producing rectilinear motion, includes an integral mounting stud 43 at one end for securing the one end to the carrier plate 34, and an inner end cap including a threaded recess by means of which a translation unit is attached to the bellows, as will be described.

The bellows bushing 41 controls small lateral deflections of the bellows. A translation carrier 45 is a cylindrical housing secured to the bellows carrier 40 at the inner end thereof and being axially aligned therewith. This carrier supports a liner bushing 46 for guiding the rectilinear movement of a translation member 47 within the carrier 45.

The translation member 47 is illustrated in detail in FIG. 7 and includes a cylindrical sleeve 48 closed at its outer end by an end cap or head 49 having an integral projecting stud for securing the translation member to the bellows 42, and having an inner end cap or head 50 adjacent to the base of the hub unit housing 31.

The sleeve 48 is provided with a diametrically opposed, axially elongated slots 51 for a purpose to be described. The sleeve 48 is also provided with a switch contact plate in the form, for example, of a phenolic base secured to the sleeve and carrying a copper clad L-shaped contact plate 55 facing outward of the sleeve. This switch plate is provided to coact with a pair of spring loaded contacts 56 and 57 carried in parallel bores in a switch housing 58 threaded into a threaded hole in one side wall of the translation carrier 45. The contacts are urged in a direction normal to the switch plate 55; and the translation member 47 is rotationally confined to maintain the contact plate in the appropriate plane.

The switch contacts 56 and 57 are indicated in broken lines in FIG. 7. With reference to FIG. 7, it will be seen that by rotating the switch housing 58 the position of the contact 56 relative to the edge 59 of the metallic switch plate 55 may be changed. By this means then the precise time at which the switch contact is either made or broken may be adjusted over the entire pressure range of the gauge, through rotation of the switch housing 58 relative to the translation carrier 45.

In FIGS. 3, 4 and 5 of the drawing, the translation member 47 is illustrated in the position wherein movement downward, as viewed in the drawing, or toward the base of the housing 31 is effected by the bellows when the tires are inflated to normal pressure; and the translation member will then move upward, as viewed in the drawings, in response to pressure decrease. The normal operating condition is indicated in FIG. 7, wherein the switch contact 57 is bearing against the switch plate 55, while the contact 56 is not bearing against the switch plate 55, lying above the plate edge 59. The circuit control by this keying switch 58 is then opened; and this circuit will be closed when the translation member 47 moves upward in response to pressure decrease to a point where the contact edge 59 engages the switch contact 56.

The above-described translation member 47 also drives a visual indicator to provide a direct reading of pressure at the hub unit. This mechanism includes a drive shaft 60 including a larger diameter central portion and reduced diameter end journal portions which extend through and are journaled in precision bearings mounted in the walls of the translation carrier 45. The drive shaft extends transversely through the translation carrier and is rotatably supported on an axis perpendicular to and intersecting the central longitudinal axis of the translation member, the shaft passing through the above mentioned slots 51 in the sleeve 48. These slots may perform the function of limiting rotation of the translation member relative to the translation carriers and, of course, the slots permit the desired axial movement of the translation member.

The drive shaft 60 is driven by the translation member through a non-backlash system which includes a cable 62 anchored to and wrapped around the enlarged portion of the drive shaft and having the free ends passing through holes in tensioning adjusting screws 63 and 64, with the free ends of the cable then being knotted to retain the ends of the cable within the screws. As best seen in FIG. 3, the tensioning screws 63 and 64 are secured in opposed threaded holes in the outer and inner end caps 49 and 50, respectively, of the translation member. As best seen in FIG. 5 the tensioning screws, and therefore the upper and lower runs of the cable 62, may be slightly offset to prevent binding of the cable; and a spacer 65 fabricated of a material such as Teflon for example may be provided on the shaft to prevent binding of the cable. Through appropriate adjustment of the tensioning screws 63 and 64 then, cable tension may be controlled to prevent backlash and also to index or calibrate the indicator needle. As seen in FIGS. 2, 3 and 4, the indicator pointer is a U-shaped member 66 having the free end of its legs nonrotatably fixed to the opposite ends of the drive shaft 60, so that the base thereof defines an indicator line moved in an arcuate path over an arcuate dial.

As seen in the drawings, the arcuate dial is provided by a plate member 67 suitably secured to the carrier plate 34 and provided with a raised portion defining an elongated arcuate face 68 bearing suitable numbers to indicate the range of air pressure for which the hub unit is designed. A protective outer plate 69, of clear plastic for example, is secured over the gauge plate and includes a similar elongated arcuate portion providing a path for pointer movement and protecting the pointer from damage.

Referring now to the pneumatic system of the hub unit 30, a fill valve 70 which is a conventional automotive type fill valve is mounted on the carrier plate 34 to project outward from the hub unit face for convenient servicing. Tire check valves 71a and 71b are disposed within the mounting studs 37a and 37b respectively which define housings for these check valves. The fill valve 70 is connected to the stud 37a and check valve 71a through a conduit 72a. A conduit 72b in turn connects the valve 71a with the hollow mounting stud 43 of the bellows 42, and therefore with the bellows chamber; and a conduit 72c in turn connects the bellows stud 43 with the mounting stud 37b and the tire valve 71b contained therein. The conduits 72a, 72b and 72c then define a manifold chamber closed by the fill valve and the two tire check valves and open to the chamber of the bellows 42 so that the pressure in this manifold is always reflected in the bellows.

The mounting studs 37a and 37b define internal tire conduits; and the external projecting ends of these mounting studs provide means for attaching the external tire conduits 73a and 73b which communicate the check valves 71a and 71b with the respective pneumatic tires. These external conduits 73a and 73b may be formed with any suitable material such as rubber hose, plastic tubing, or metallic tubing.

Referring to FIG. 4, a transmitter for the hub unit 30 is indicated by an enclosing housing 80 which is suitably secured to the carrier plate 34; with the housing providing space for mounting appropriate batteries such as mercury batteries for powering the transmitter. The transmitter, for example, may be a single channel tone type transmitter which is tone modulated by an audio oscillator operating at a frequency within a range from about 500 Hz. to about 5,000 Hz. The transmitting frequencies for one or more hub units are selected so that a receiver may receive and identify the signals from a plurality of transmitting hub units.

A master switch 84 may be integrally associated with the transmitter 80 with a rotatable switch operator extending from the face of the hub unit. A master switch 84 corresponds to the master switch discussed with reference to the diagram of FIG. 1 including the switch arm 20 and the contacts 21 and 22. Turning the switch to the on position, of course, conditions the transmitter to be keyed or energized by the keying switch 55.

As mentioned above, the transmitter is mounted on the carrier plate 34 in a manner that the carrier plate functions as an antenna for the transmitter.

FIG. 8 of the drawing is a schematic diagram illustrative of a portion of a radio receiver circuit which may be used with the above-described transmitter. This receiver, which may be basically a tone modulated standard FM radio is preferably mounted in the cab or operator compartment of a truck or bus. The received signal will produce an audible tone through the audio amplifier which will be a tone at a frequency of between 500 and 5,000 Hz., depending of course on the particular transmitting unit. Additionally, the signal after passing through the first audio amplifier stage may be taken off and passed through a band pass filter network 86, as indicated in FIG. 8. Band pass filters 87 of this network will be selected, of course, to respond to signals transmitted from a plurality of hub units. In the illustrated example, four such band pass filters will pass signals of 500, 1,000, 2,500, and 5,000 Hz. respectively. The output of each band pass filter is connected to a respective signal lamp so that when a fault or warning signal is heard by the vehicle operator on the radio he may observe the signal lamps to identify which of four hub units is transmitting.

The operation of the apparatus and system described above with reference to FIGS. 1 through 8 will now be summarized.

To inflate the two tires of the dual wheel unit, the service air hoses connected to the fill valve in the conventional manner. As soon as the pressure within the manifold, as defined by the conduits 71a, 71b and 71c, exceeds that in the tires by 1 psi, the tire check valves 71a and 71b will be opened by the differential pressure across the valves; and the increasing pressure in the tires will lag the increasing pressure in the manifold by about 1 psi. The increasing pressure in the manifold acts on the bellows to extend the inner end cap inward or toward the base of the hub unit housing 31 with corresponding inward movement of the translation member 47. The pointer 66 will be rotated to indicate increasing pressure; and when the desired pressure is indicated on the gauge face 68 the supply hose is released to permit the fill valve to close. The tire check valves 71a and 71b will close substantially simultaneously, with the pressure's extant in the two tires being about 1 psi less than that in the manifold.

The unit will have been calibrated so that at the desired pressure, the keying switch plate 55 and the associated switch contacts 56 and 57 will have the approximate relative positions indicated in FIG. 7 wherein the contact plate 55 is disengaged from the contact 56. As discussed with reference to the schematic circuit of FIG. 1, this keying switch is connected in series with the transmitter; and accordingly the transmitter circuit is open and the transmitter not energized. The switch housing 58 will have been calibrated to set the distance between the contact 56 and the switch plate edge 59, so that the plate will engage the contact when it is moved a predetermined distance in response to decreasing pressure in the manifold and accordingly within the bellows 42.

For the purpose of illustration, it may be assumed that the manifold-bellows pressure is about 49 psi as indicated on the gauge face of FIG. 1; and that the pressures in the two tires connected to the unit are about 48 psi (1 psi less). If it is assumed that a slow leak develops in a tire connected to the tire conduit 73a, the pressure in this conduit will of course reduce and, as this pressure reduces to a value about 1 psi less than that in the manifold 72, the check valve 71a will open to provide pressure equalization. When the pressure differential decreases to a value of less than about 1 psi the valve again closes. This process will be repeated as the pressure decreases in the conduit 73a and its associated tire, with the pressure in the manifold and bellows lagging behind by about 1 psi. During the time of decreasing pressure in the manifold 72, the pressure in the tire conduit 73b and its associated tire will remain at the inflated value of 48 psi; and the check valve will prevent backflow of air from this tire into the manifold.

As the pressure in the manifold and bellows decreases, the bellows will be contracting with corresponding outward movement of the translation member 67; and the pointer 66 will visually indicate the decreasing pressure on the gauge face 68. When the manifold pressure reaches a preselected value below the initial 49 psi, the contact plate edge 59 will make contact with the switch contact 56 thereby closing the transmitter keying switch and energizing the transmitter to transmit a signal modulated at 1,000 Hz. for example. The receiver will detect and reproduce the transmitted signal as an audible tone; and the modulated tone signal will pass the 1,000 Hz. band pass filter 87 to energize the associated signal light 88 to identify the hub unit 30 which is transmitting.

The vehicle operator, then, by visually observing the hub unit 30 at the identified dual wheel unit will note the extant pressure in the leaking tire; and may observe the rate at which the pressure is decreasing and take appropriate action. The indicated pressure corresponds to that in the tire having the lower pressure; and the operator will detect by other means which of the tires of the dual wheel unit is losing pressure.

If desired, the operator may then switch the master switch to the off position to de-energize the radio signaling system, since this portion of the system can furnish the operator no additional information until the tire is reinflated to a normal operating pressure.

Periodically the vehicle operator or those charged with maintaining the vehicle may wish to test the transmitter and receiver operation by switching the master switch to the test position as discussed with reference to FIG. 1.

DOUBLE READOUT INDICATING APPARATUS

Figure 9:
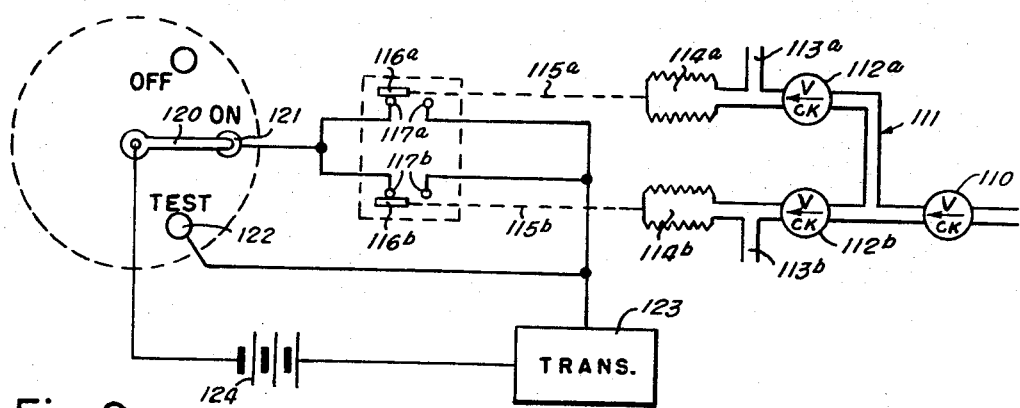
FIG. 9 is a combination diagrammatic and schematic view of pneumatic and electrical systems according to another form of apparatus according to the invention.

FIG. 9 is a schematic diagram of pneumatic and electric circuitry for a Double Readout indicating apparatus according to the invention, which is so named because it includes a visual gauge on the face of the hub unit which indicates the pressures in both tires of the dual wheel unit. In this system, there are two separate bellows, each associated with and reflecting the pressure within an associated tire of a dual wheel unit, each bellows operating a separate gauge pointer for indicating the respective pressure. In the system illustrated in FIG. 9, each bellows operates a separate keying switch for energizing a common transmitter to transmit a fault or warning signal which identifies the hub unit but not the particular tire of the hub unit which has lost pressure.

Referring to the system as illustrated in FIG. 9, the tires of the dual wheel unit are inflated through a fill valve 110 which communicates with tire check valves 112a and 112b through a manifold 111, which may be defined by conduits or by a common housing for the fill valve and check valves. The tire check valves are communicated with the respective tires through tire conduits 113a and 113b respectively; and individual bellows 114a and 114b communicate with the conduits 113a and 113b respectively so that these bellows are in constant communication with the chambers of respective tires. The bellows 114a and 114b are connected through suitable linkages 115a and 115b to sliding switch plates 116 of keying switches, the sliding plates being movable relative to spaced fixed contacts 117 to open and close associated circuits. The two keying switches 116a and 116b are connected in parallel with each other and are connected in series with a switch arm 120 and the "on" contact 121 of a selector switch, and with a transmitter 123 and battery 124. With the selector switch in the "on" position, then, the transmitter may be energized through either of the keying switches 116a or 116b. For testing the transmitter, a series test circuit through the master switch contact 122 by-passes the keying switches 116a and 116b to test transmitter operation.

Figure 10:
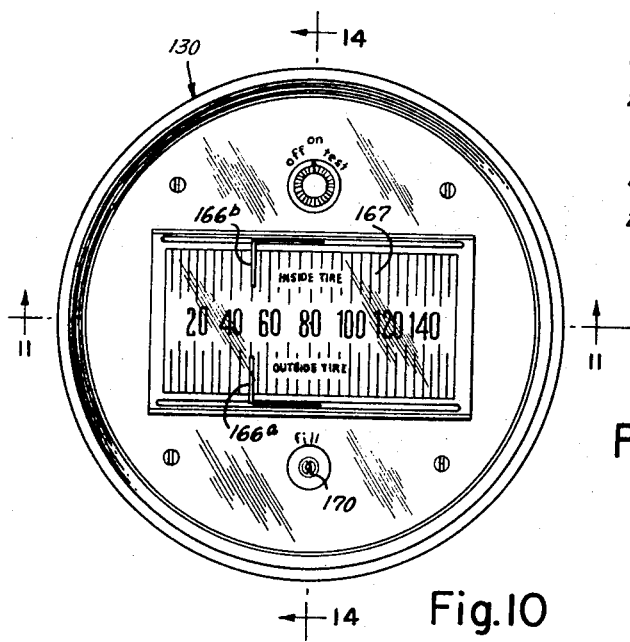
FIG. 10 is a view similar to FIG. 2 illustrating the face of a hub unit for attachment to a wheel hub, and including a pressure gauge for separately indicating pressures in two tires.
Figure 11:
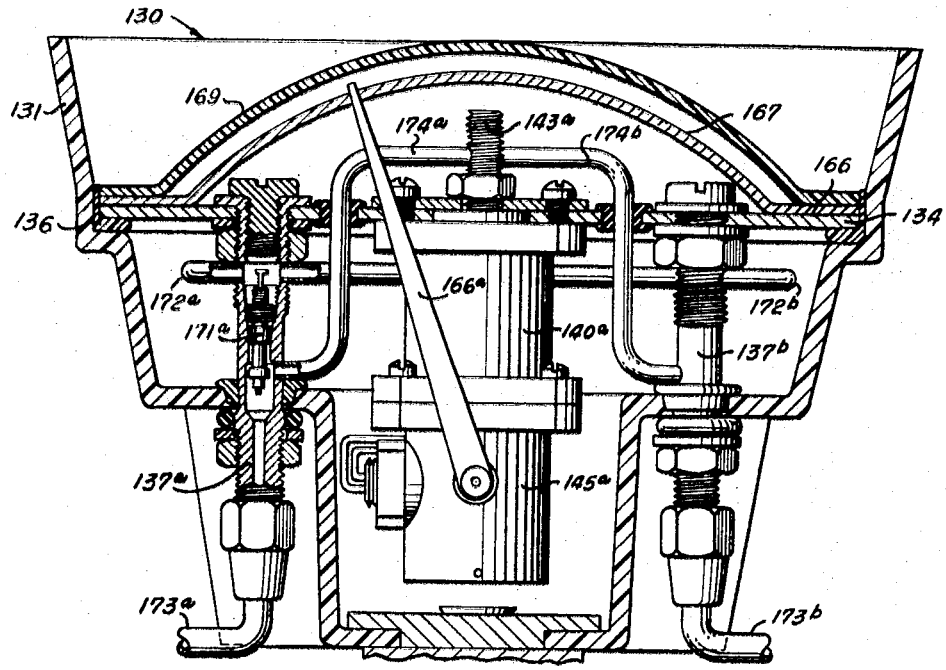
FIG. 11 is a sectional view taken along the line 11—11 of FIG. 10 through the axis of rotation of the hub unit.

Referring particularly to FIGS. 10 and 11 of the drawing, there is shown a hub unit 130 embodying the system of FIG. 9. The hub unit 130 is similar in many respects to the unit 30 of FIG. 2; and corresponding reference numbers in the "100 series" are used in FIGS. 10 and 11 to identify the parts which correspond to those of the hub unit 30.

The housing 131 and the associated mounting bracket 132 and associated structure are identical to those previously described; and the carrier plate 134 is substantially identical to that previously described being seated on the housing shoulder 135 through a shock absorbing gasket 136. Mounting studs 137a and 137b anchor the carrier plate 134 to the housing in the manner previously described.

In the hub unit 130, two identical translation mechanisms are provided, one such mechanism including a bellows carrier 140a and a translation carrier 145a which are secured together and supported on the carrier plate 134 in the manner previously described. This translation mechanism is substantially identical to the mechanism previously described including the bellows carrier 40 and the translation carrier 45, with the exception of the gauge pointer 166a which has a slightly different configuration.

Figure 14:
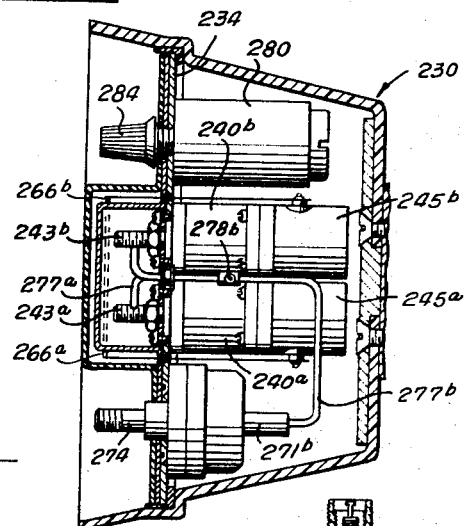
FIG. 14 is a view of the hub unit of FIG. 13 taken in an axial plane perpendicular to that of FIG. 13.

As viewed in FIG. 11, a second translation unit consisting of a bellows carrier 140b and a translation carrier 145b is disposed directly behind the unit 140a, 145a, with the axis of rotation of the hub unit 130 passing between these translation mechanisms. As viewed in an axial plane perpendicular to that of FIG. 11, these translation mechanisms are disposed side-by-side (in relative positions as illustrated in FIG. 14).

The gauge pointer for the translation unit 140a, 145a is an L-shaped member having the free end of its leg nonrotatably attached to the drive shaft 160a and the base of the pointer 166a defining a line indicator overlying a portion of the arcuate elongated face 168 of the gauge plate 167 which is secured to the carrier plate 134 in the manner described.

The gauge pointer 166b driven by the translation mechanism 140b, 145b extends through the associated slot at the opposite side of the gauge plate 167, so that the pressures for both tires are indicated on the common gauge face 168. As indicated in FIG. 10 by way of example, the gauge pointer 166a indicates the pressure of the outside tire of the dual wheel unit while the gauge pointer 166b indicates the pressure of the inside tire.

Each of the translation units includes a keying switch as indicated by the switch housing 158a, the two keying switches 158a and 158b being connected in parallel in the manner of the switches 116, 117 of the schematic circuit of FIG. 9. Accordingly, either keying switch may energize a common transmitter 180 carried in the hub unit 130.

Referring to the pneumatic circuit, the fill valve 170 communicates with the chamber of the mounting stud 137a on the upstream side of associated tire check valve 171a through conduit 172a; and a conduit 172b extends from this chamber to the corresponding chamber in the mounting stud 137b on the upstream side of the tire check valve 171b. The conduits 172a and 172b then define the pressure manifold 172 closed by the fill valve and check valves.

The chamber of the mounting stud 137a on the downstream side of the check valve 171a defines an internal tire conduit which is communicated with the mounting stud 143a of its associated bellows 142a through a conduit 174a. The external tire conduit 173a connected to the exterior projecting end of the stud 137a connects the associated tire chamber with the stud chamber. It will be seen then that the chamber of a bellows 142a, contained within the bellows carrier 140a, is in constant communication with an associated tire chamber through the bellows stud 143a, conduit 174a, mounting stud 137a and external tire conduit 173a.

In a similar manner, the chamber in the mounting stud 137b on the downstream side of the check valve is communicated with a bellows 142b through its associated mounting stud 143b and a conduit 174b. The chamber of this bellows 142b then is in constant communication with its associated tire chamber through the bellows stud 143b, conduit 174b, mounting stud 137b and external tire conduit 173b.

The operation of the hub unit 130 is quite similar to that of the hub unit 30 and the differences may be briefly summarized as follows. During the filling of the unit, the tire check valves 171a and 171b are opened by the 1 pound pressure differential as previously described. During the filling, the gauge pointers 166a and 166b will separately indicate the pressures of the respective tires. When the filling is completed, the pressure in the manifold 172 will be approximately 1 psi higher than that of the two tire chambers. Should the tire associated with the tire conduit 173a develop a leak, the pressure in this conduit and in the associated bellows 142a will decrease, with the pressure decrease being indicated by the gauge pointer 166a. When the pressure differential between the conduit 173a and the manifold 172 exceeds 1 psi, the check valve 171a will open to equalize the pressure in the manner described; and accordingly the pressure within the manifold will follow the decreasing pressure within the conduit 173a. The check valve 171b however remains closed to maintain the normal pressure in the tire associated with the tire conduit 173b.

When the pressure in the bellows 142a decreases to the predetermined value, the keying switch 158a will be closed to energize the circuit for the transmitter 180 to produce the desired signal in the cab receiver as described above.

Since the hub unit 130 includes a single transmitter, the fault or warning signal will only identify the particular transmitting hub unit 130 in the same manner as described for the hub unit 30. Through visual observation of the hub unit however the operator may immediately note whether it is the outer or inner tire which has lost pressure. In an alternative form, the hub unit 130 could contain two separate transmitters separately energized by the keying switches 158a and 158b. With the transmitters producing modulated tones at different frequencies, the operator could immediately identify which tire of the indicated wheel unit is losing pressure.

MANUAL EQUALIZATION VALVE MODIFICATION

Figure 13:
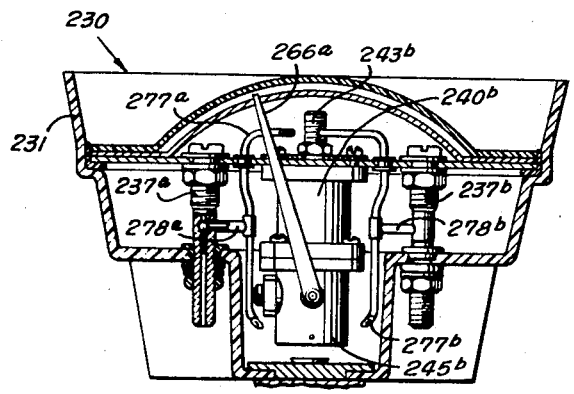
FIG. 13 is a sectional view, similar to that of FIG. 11, of a hub unit employing dual bellows and a manifold housing as illustrated in FIG. 12 for example.

FIGS. 13 and 14 of the drawing illustrate a modified form of double readout hub unit 230 which is quite similar to the hub unit 130 illustrated in FIGS. 10 and 11. The distinguishing feature of the hub unit 230 is that the fill valve, the two tire check valves, and the interconnecting conduits referred to above as a manifold are now embodied in a unitary assembly. In illustrating and describing this hub unit 230, the several parts of the unit which correspond to those previously described will be referred to by corresponding reference numbers in a "200 series."

Figure 12:
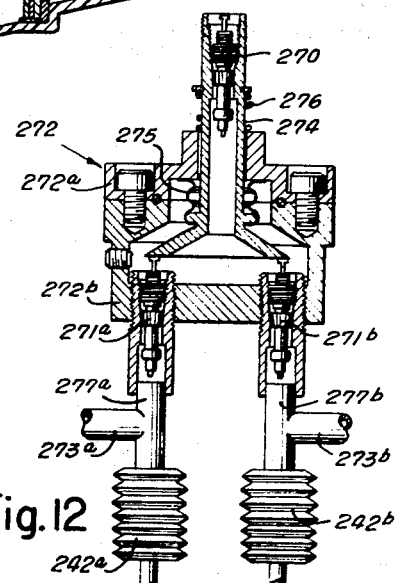
FIG. 12 is a detail sectional view of a manifold housing including manual means for opening the tire conduit check valves, along with a schematic diagram of separate bellows.

FIG. 12 of the drawing is a combination structural and diagrammatic view of a pneumatic system which corresponds to the pneumatic portion of a diagrammatic system of FIG. 9. In this figure, a manifold structure 272 is formed from housing portions 272a and 272b which are suitably secured by cap screws for example to define a manifold chamber. The manifold 272 is secured to the carrier plate 234 of the hub unit 230 in any suitable manner, as indicated in FIG. 14. As seen in the cross sectional view of the manifold in FIG. 12, the check valves 271a and 271b are contained in suitable valve housings which are threaded into the lower manifold housing 272b, with the valve release plungers extending into the manifold chamber.

The fill valve 270 is mounted in an elongated valve stem 274 which extends through an aperture in the upper manifold housing portion 272a in sliding relation; the valve stem 274 including a lower skirt disposed within the manifold chamber which engages the valve plungers of the check valve 271a and 271b. A sealing bellows 275 is provided within the manifold chamber to provide an air seal between the stem and the housing aperture for the valve stem, to permit limited rectilinear movement of the valve stem 274. A spring 276, interposed between the exterior of the manifold housing portion 272a and a suitable retainer ring on the exterior portion of the valve stem 274, urges the stem outward relative to the manifold to maintain the stem skirt out of engagement with the check valve plungers. The diagrammatic portion of FIG. 12 includes internal tire conduits 277a and 277b, which communicate the check valve housings with the respective bellows 242a and 242b, within the hub unit enclosure, and external tire conduits 273a and 273b respectively which communicate with the associated tire chambers.

The face of the hub unit 230 illustrated in FIGS. 13 and 14 may be identical to that of the hub unit 130, as illustrated in FIG. 10; and accordingly FIG. 10 is also representative of the hub unit 230 and indicates the plane in which FIG. 14 is taken.

Referring particularly to FIGS. 13 and 14, the structure of the hub unit 230 is generally similar to that of the hub units previously described including a housing 231, carrier plate 234 and gauge plate 267. The carrier plate and associated structure are secured relative to the housing by means of mounting studs 237a and 237b in the manner previously described, with the mounting studs functioning as tire conduits but not as check valve housings as in the previous embodiments.

The hub unit 230 includes two separate translation mechanisms, one being defined by the bellows carrier 240a and the translation carrier 245a and the other being defined by the bellows carrier 240b and translation carrier 245b. These translation mechanisms are identical in structure to those described previously. These translation units drive gauge pointers 266a and 266b which correspond to the pointers 166a and 166b of the unit 130 illustrated in FIG. 10.

Referring to the pneumatic system as illustrated in FIGS. 13 and 14 the interior tire conduit 277b is connected to the exposed end of the housing for the check valve 271b projecting from the manifold 272; and this tire conduit is connected to the mounting stud 243b of the bellows in the carrier 240b. A branch conduit 278b, as seen in FIG. 13, connects the conduit 277b to the mounting stud 237b to which the exterior tire conduit 273b is connected.

In a similar manner internal tire conduits 277a and 278a connect the tire valve 271a with the bellows carrier 240a and with the mounting stud 237a.

The operation of the unit 230 is identical to that of the unit 130 with the exception that, during the filling of the tires, when the filler hose is engaged with the fill valve stem 274 the fill valve is moved inwardly to physically open the tire check valves 271a and 271b by depressing the respective check valve plungers. During the filling then, the pressure throughout the system will be uniform with the dual pressure gauge indicating the pressures of the respective tires through the associated translation units. When the desired system pressure is attained, the fill valve stem 274 is released and urged to its normal outer position in which the check valves are released and permitted to seat, thereby isolating the associated tire chambers from the chamber of the manifold 272. This system provides for manual pressure equalization when filling the tires.

Manual pressure equalization may also be effected at any time by the vehicle operator when unequal pressures develop in the tires of the dual wheel unit. When the operator learns, through the above-described signaling system, that the pressure in one tire of the unit has reduced to the point necessary to energize the transmitter 280, the operator may stop the vehicle and observe the difference in pressures as indicated on the face of the hub unit. If desired, the operator may depress the valve stem 274, without opening the fill valve 270, thereby opening the check valves 271a and 271b to communicate the respective tire chambers through the manifold chamber 272. This may be employed as a temporary measure until the vehicle can be driven to a service area.

Figure 15:
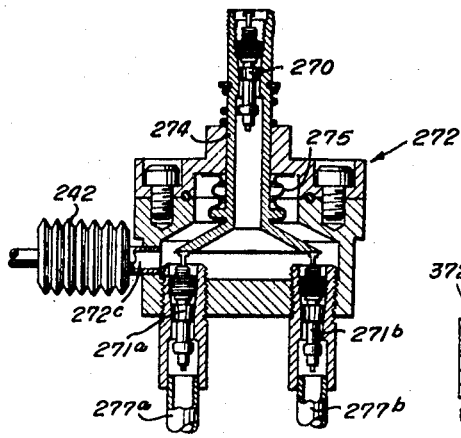
FIG. 15 is a detail sectional view of the manifold housing of FIG. 12 diagrammatically illustrated for use with a common bellows for two tires according to the system of FIG. 1.

FIG. 15 is a combination structural and diagrammatic view of the manifold 272 as embodied in a single readout indicating apparatus and wherein the pneumatic circuit corresponds to that illustrated schematically in the pneumatic portion of the diagram of FIG. 1. In this modification, the internal tire conduits 277a and 277b are communicated only with the respective mounting studs 237a and 237b, to which the external tire conduits are connected externally of the hub unit. The bellows 242, which would be physically embodied in a translation unit as described with reference to FIGS. 2, 3 and 4, is communicated with the chamber of the manifold 272 through a conduit 272c.

A single readout indicating apparatus embodying the manifold 272 functions in the same manner as that of the hub unit 30, with the additional feature of providing for manual equalization between the two tires of a dual wheel unit by depressing the fill valve stem 274 as described above.

AUTOMATIC EQUALIZATION VALVE MODIFICATION

Figure 16:
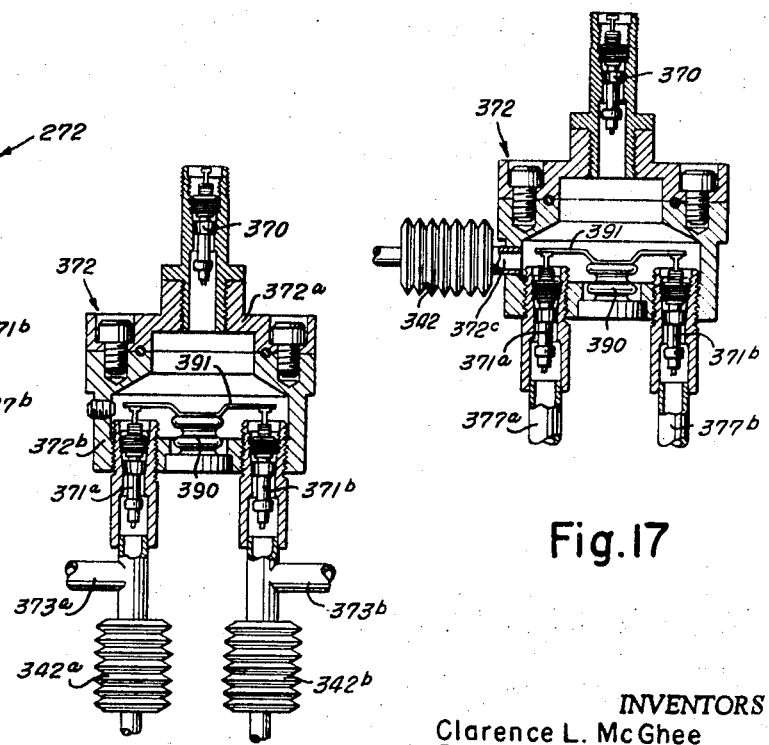
FIG. 16 is a detail sectional view of another form of manifold housing diagrammatically illustrated for use with a dual bellows system according to FIG. 9.
Figure 17:
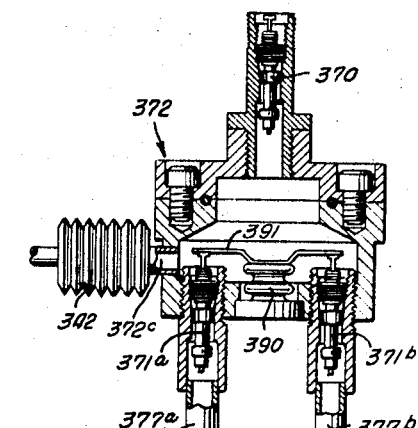
FIG. 17 is a fragmentary sectional view of the manifold housing of FIG. 16 diagrammatically illustrated for use with the single bellows system of FIG. 1.

FIGS. 16 and 17 of the drawing illustrate another form of unitary manifold and valve assembly which provides for automatic equalization of pressures between the two tires of a dual wheel unit. FIG. 16 is a combination cross sectional and diagrammatic illustration of an automatic valve manifold 372 as adapted for use in a dual readout system as illustrated schematically in FIG. 9; and FIG. 17 is a combination cross sectional and diagrammatic view of the automatic valve manifold 372 as adapted for use in a single readout system as illustrated diagrammatically in FIG. 1.

Referring particularly to FIG. 16, the manifold 372 consists of housing parts 372a and 372b joined by suitable cap screws to define a manifold cavity, and may have the same external configuration as that of the above-described manual equalization manifold 272. A fill valve 370 contained in an appropriate valve stem 374 is threadedly mounted on the manifold housing 372a to communicate with the manifold chamber; and the tire check valves 371a and 371b in appropriate stems are threadedly secured to the manifold housing portion 372b in a manner that the valve plungers extend into the manifold chamber.

A longitudinally expansible bellows 390 is secured to the bellows housing portion 372b extending into the bellows chamber; and a transverse valve actuator arm 391 is secured to the inner end of the bellows 390 and positioned to engage the plungers of the two tire check valves 371a and 371b. The inner chamber of the bellows 390 is opened to the exterior of the manifold housing and therefore open to atmospheric pressure and is selected so that the bellows will yield in response to pressures within the manifold chamber at or near the normal tire pressure to hold open the check valves 371a and 371b.

As seen in the drawing, the two check valves are connected to the respective tires and to associated bellows 342a and 342b of the respective translation mechanisms in the same manner as the above-described manifold 272.

When this manifold 372 is embodied in a double readout hub unit such as the hub unit 230 or the hub unit 130 previously described, the overall apparatus functions within the same manner to visually indicate the tire pressures for both tires, and to energize the transmitter 380 in response to a predetermined pressure loss in either of the tires. Additionally, this system maintains automatic equalization between the two tires of a dual wheel unit so long as the pressure remains above the predetermined desired pressure. When the tires are inflated to the desired pressure for example, the pressure within the manifold 372 builds up, acting on the bellows 390 to open and hold open the check valves 371a and 371b. When the desired operating pressure is reached, as noted on the unit gauges, the service hose is released.

The bellows 390 may be preselected for example to expand through its spring constant into the manifold chamber to release the check valve plungers at a preselected pressure which may be for example 10 psi below the normal operating pressure. So long as the pressure remains above this preselected design value, the chambers of the two tires remain in communication through the manifold and, of course, maintain pressure equalization. Under operating conditions then, unequal pressure build-up will be compensated for and the pressure equalized through this system. By the same token should a slow leak develop in one of the tires, the pressure throughout the system will drop gradually until such time as the pressure reduces to the preselected value, such as 10 psi below normal. At said reduced pressure, the bellows will expand into the manifold chamber to release the check valve plungers which close to isolate the tires from each other. The leaking tire will continue to lose pressure; however, the good tire will hold its then extant pressure through its check valve to permit operation until the vehicle can be driven to a service area.

FIG. 17 illustrates the same automatic equalization manifold 372 for use in a single readout system. In this arrangement, the check valves 371a and 371b are communicated directly with the respective associated tire; while a common bellows 342 for the associated translation mechanism is communicated directly with the manifold chamber through a conduit 372c.

A hub unit embodying this automatic equalization manifold functions in the same manner as the hub unit 30 with respect to the visual indication of the tire pressure, which is the lower pressure in this single readout system, and with respect to the energization of the transmitter 380 to provide the fault signal. This apparatus provides the additional function however of automatically equalizing the tire pressures so long as the system pressure remains above a preselected pressure such as 10 psi below the normal operating pressure. When the system pressure reduces to this preselected value, the associated check valve isolates the good tire from the remainder of the system to maintain the extant pressure within the good tire until the vehicle may be driven to a service area.

While the embodiments described above are particularly adapted for vehicles having dual wheel units, it will be apparent that the apparatus and system may be employed with a single wheel unit by merely eliminating one tire conduit branch and associated check valve, and eliminating the tire check valve in the remaining tire conduit branch so that the fill valve functions as the only required check valve.

What has been described then is a system and apparatus adapted for use with vehicles having single wheel units and more particularly double wheel units, the apparatus including local hub units for each wheel unit which perform the dual functions of providing a visual indication of the tire pressure and energizing a radio transmitter to transmit a warning signal to a remote receiver monitored by a vehicle operator.

In a more economical system, the hub unit for a dual wheel unit includes a single pressure gauge and a single transmitter, and a pressure responsive mechanism which responds to the lower pressure in the two tires of the wheel unit to produce the fault signal and to indicate such lower pressure. In a more complete system, the hub unit may include mechanisms responsive to the pressures in both tires to provide separate visual indication of the two tire pressures and to energize a common transmitter. Where the pressures in four or more wheel units are being monitored, the several hub unit transmitters may be modulated at different frequencies and the receiver provided with means for separately detecting the several modulated frequencies to produce visual indication of the particular wheel unit location on the vehicle which is faulting.

A feature of one form of the apparatus is that, while the two tires of a dual wheel unit are normally isolated from each other, manual means are provided for readily communicating the tire chambers of the two tires to equalize the pressures therein. This may be done during periodic stops to check tire condition.

In another form of the apparatus, the two tires of a dual wheel unit are maintained in constant communication for pressure equalization until such time as the entire system pressure reduces to a preselected value. At such time the tires are isolated from each other and the system warns the operator of the low pressure.

While preferred embodiments of the invention have been illustrated and described, it will be understood by those skilled in the art that changes and modifications may be resorted to without departing from the spirit and scope of the invention.

What is claimed is:

1. Pressure indicating apparatus for use with a vehicle pneumatic dual wheel unit comprising a hub unit adapted to be mounted on a wheel unit for rotation therewith;

a pressure responsive mechanism mounted in the hub unit;

conduit means and associated valve means for communicating said pressure responsive mechanism with at least the one tire of said dual wheel unit; said conduit means and associated valve means including a first conduit and first associated check valve for controlling the flow of air into a first tire of a dual wheel unit, a second conduit and associated second check valve for controlling the flow of air into a second tire of a dual wheel unit, a common fill valve for both tires of the dual wheel unit, and a manifold communicating said fill valve with said first and second check valves;

and pressure indicating means mounted in said hub unit and actuated by said pressure responsive mechanism.

2. Pressure indicating apparatus as set forth in claim 1 wherein said manifold is defined by a housing having said fill valve and said first and second check valves mounted thereon;

said fill valve being disposed in a valve stem slidably mounted in said manifold housing; said valve stem having integral actuator means for engaging said first and second valve, and being movable manually for opening simultaneously said first and second check valves to communicate the first and second tires through said manifold;

and spring means urging said fill valve stem out of engagement with said check valves.

3. Pressure indicating apparatus as set forth in claim 1 wherein said manifold comprises a housing having said fill valve and said first and second check valves mounted thereon;

pressure responsive means disposed within said manifold for opening simultaneously said first and second check valves in response to a manifold pressure above a preselected level, whereby the tires of said dual wheel unit are communicated through said manifold;

wherein said manifold pressure responsive means comprises a linear bellows having a chamber communicating with the exterior of said manifold housing, and including means extending the bellows into the manifold chamber; and check valve operating arms mounted on said manifold bellows for opening said check valves in response to a predetermined compression of said manifold bellows.

4. Pressure indicating apparatus as set forth in claim 1 wherein said pressure responsive mechanism communicates with said manifold;

and wherein said first and second check valves are designed to open in response to a low pressure differential between said manifold and a respective tire, whereby the manifold pressure will correspond approximately to the lower of the two tire pressures.

5. Pressure indicating apparatus as set forth in claim 1 wherein said pressure indicating means mounted in said hub unit is a visual gauge indicating pressure levels.

6. Pressure indicating apparatus as set forth in claim 5 wherein said pressure responsive mechanism comprises two individual mechanisms communicating respectively with said first and second tire conduits;

and wherein said pressure indicating means includes two visual gauges actuated by respective individual pressure responsive mechanisms and indicating pressure levels.

7. Pressure indicating apparatus as set forth in claim 6 wherein each of said two individual pressure responsive mechanisms includes a longitudinally expansible chamber means having its expansion axis disposed substantially along the axis of rotation of the wheel unit.

8. Pressure indicating apparatus as set forth in claim 7 wherein each of said two individual pressure responsive mechanisms includes a translation member coupled to said expansion chamber means and guided for reciprocating movement within said hub unit substantially along the axis of rotation of the wheel unit;

and wherein each such translation member drives a respective visual gauge.

* * * * *